United States Patent
Sun et al.

(10) Patent No.: US 7,448,068 B2
(45) Date of Patent: Nov. 4, 2008

(54) AUTOMATIC CLIENT AUTHENTICATION FOR A WIRELESS NETWORK PROTECTED BY PEAP, EAP-TLS, OR OTHER EXTENSIBLE AUTHENTICATION PROTOCOLS

(75) Inventors: Ray Sun, Seattle, WA (US); Zeke Koch, Seattle, WA (US); Yu Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 10/427,034

(22) Filed: Apr. 29, 2003

(65) Prior Publication Data

US 2004/0078597 A1 Apr. 22, 2004

Related U.S. Application Data

(60) Provisional application No. 60/420,365, filed on Oct. 21, 2002.

(51) Int. Cl.
*H04L 9/00* (2006.01)
*G06F 7/04* (2006.01)

(52) U.S. Cl. .................. 726/2; 726/3; 726/4; 726/5; 726/6; 726/12; 726/14; 726/19; 726/28; 726/29; 726/30; 380/270; 713/183

(58) Field of Classification Search .................. None
See application file for complete search history.

(56) References Cited

U.S. PATENT DOCUMENTS

| 6,055,575 A | 4/2000 | Paulsen et al. ............... 709/229 |
| 6,996,714 B1* | 2/2006 | Halasz et al. ................ 713/163 |
| 7,050,993 B1* | 5/2006 | Piikivi et al. ................... 705/26 |
| 7,107,620 B2* | 9/2006 | Haverinen et al. ............. 726/29 |
| 2002/0013831 A1 | 1/2002 | Astala et al. ................ 709/220 |
| 2002/0087894 A1* | 7/2002 | Foley et al. ................. 713/202 |
| 2003/0097593 A1* | 5/2003 | Sawa et al. .................. 713/201 |
| 2003/0135765 A1* | 7/2003 | Hind et al. .................. 713/202 |
| 2003/0226017 A1* | 12/2003 | Palekar et al. ............... 713/168 |
| 2004/0093522 A1* | 5/2004 | Bruestle et al. .............. 713/201 |

OTHER PUBLICATIONS

Alain Ringapin et al.; "Mobility and Security in IP Network"; 2002 IEEE; pp. 280-284.

(Continued)

*Primary Examiner*—Ayaz Sheikh
*Assistant Examiner*—Saoussen Besrour
(74) *Attorney, Agent, or Firm*—Merchant & Gould PC

(57) ABSTRACT

The present invention is directed at providing a system and method for Automatic Client Authentication for a Wireless Network protected by PEAP, EAP-TLS, or other Extensible Authentication Protocols. The user doesn't have to understand the difference between the protocols in order to connect to the network. A default authentication protocol is automatically attempted. If not successful, then the authentication switches over to another authentication method if the network requests it.

26 Claims, 13 Drawing Sheets

OTHER PUBLICATIONS

Hui Luo et al.; "A Secure Public Wireless LAN Access Technique That Supports Walk-Up Users"; Globecom 2003; pp. 1415-1419.

Paul Ardoin, "Positive Identification in a Wireless World"; Database and Network Journal, vol. 33, No. 1; p. 9.

Young Kim, "802.11b Wireless LAN Authentication, Encryption, and Security", Internet Citation, May 31, 2001, pp. 1-18.

Earthlink, Inc., "Changing a Phonebook Entry's Username and Password in Dial-Up Networking", http://web.archive.org/web/20020813063942/http://support.earthlink.net/mu/1/psc/img/walkthroughs/windows_9x_nt/dialers/phonebook_entry/0382.5v.correct.psc.html>, Aug. 13, 2002, 3 pgs.

Andersson et al., "Protected EAP Protocol (PEAP)", PPPEXT Working Group, Internet-Draft, <draft-josefsson-pppext-eap-tls-eap-05.txt>, Sep. 2002, pp. 1-43.

Beat Augsburger, "SwiNOG—Swiss Network Operators Group—SwiNOG 5", www.swinog.ch/meetings/swinog5, Sep. 25, 2002, 20 pgs.

B. Aboba, "The Unofficial 802.11 Security Web Page", www.drizzle.com, Oct. 17, 2002, pp. 1-8.

* cited by examiner

AUTOMATIC CLIENT AUTHENTICATION FOR A WIRELESS NETWORK PROTECTED BY PEAP, EAP-TLS, OR OTHER EXTENSIBLE AUTHENTICATION PROTOCOLS

CROSS REFERENCE TO RELATED APPLICATIONS

This application claims the benefit of U.S. Provisional Application Ser. No. 60/420,365, filed Oct. 21, 2002, the benefit of the earlier filing date of which is hereby claimed under 35 U.S.C. § 119 (e).

FIELD OF THE INVENTION

The present invention relates generally to authentication, and more particularly to authentication for a wireless network.

BACKGROUND OF THE INVENTION

Wireless networks like 802.11b (also known as Wi-Fi or Wireless Ethernet) are more susceptible to hackers than wired networks since the hackers don't have to physically connect to the network. In response to the susceptibility of hackers, a variety of frameworks have been created to ensure authentication of wireless network users, especially for corporations. One of those frameworks is called 802.1x. Within the framework of 802.1x, there are multiple possible authentication protocols, and two of those include EAP-TLS (Extensible Authentication Protocol—Transport Layer Security) and PEAP (Protected Extensible Authentication Protocol). In order to use a wireless network protected by 802.1x, the wireless client has to support the right authentication protocol. Additionally, the user to select the correct authentication protocol before connecting.

SUMMARY OF THE INVENTION

The present invention is directed at providing a system and method for Automatic Client Authentication for a Wireless Network protected by PEAP, EAP-TLS, or other Extensible Authentication Protocols.

According to one aspect of the invention, a user does not have to understand the difference between the protocols in order to connect to the network.

Accord to another aspect of the invention, a default authentication protocol is automatically attempted to connect to the network. If the authentication method is not successful, then a switch to another authentication method is made if the network requests it.

DETAILED DESCRIPTION OF THE PREFERRED EMBODIMENT

The present invention is directed at providing a system and method for Automatic Client Authentication for a Wireless Network protected by PEAP, EAP-TLS, or other Extensible Authentication Protocols. A default authentication protocol is automatically attempted. If the authentication method is not successful, then a switch to another authentication method is made if the network requests it.

Throughout the specification, the term "wi-fi" is short for wireless fidelity and is meant to be used generically when referring of any type of 802.11 network, whether 802.11b, 802.11a, dual-band, and the like. The term "AP" refers to an access point used to connect wireless network devices to a network. The term "SSID" refers to Service Set Identifier.

Figure 1:
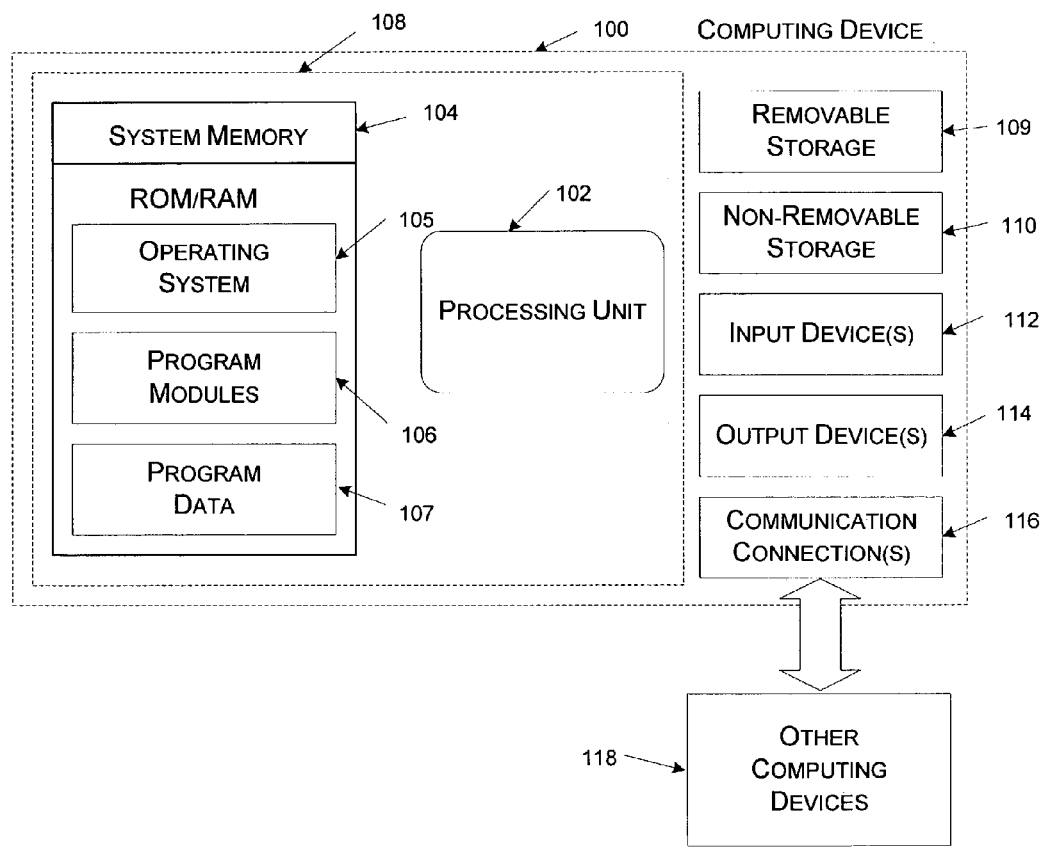
FIG. 1 is a functional block diagram of one computing device adapted to implement one embodiment of the invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. The network may be wireless or wired. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
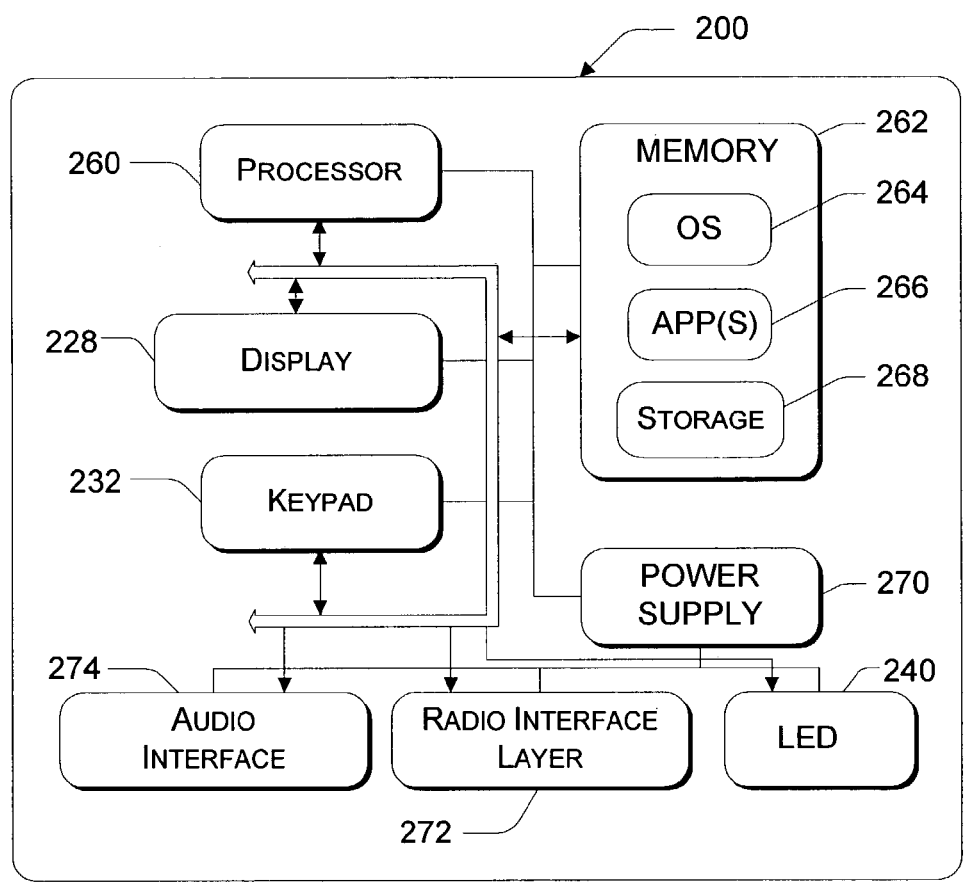
FIG. 2 illustrates a mobile computing device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. An authentication application also resides on the mobile computing device 200 and is programmed for authentication on a wireless network.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a wireless interface layer 272 that performs the function of transmitting and receiving communications, such as radio frequency communications. The wireless interface layer 272 facilitates wireless connectivity between the mobile computing device 200 and the outside world, via a communications carrier or service provider. Transmissions to and from the wireless interface layer 272 are conducted under control of the operating system 264. In other words, communications received by the wireless interface layer 272 may be disseminated to application programs 266 via the operating system 264, and vice versa.

Figure 3:
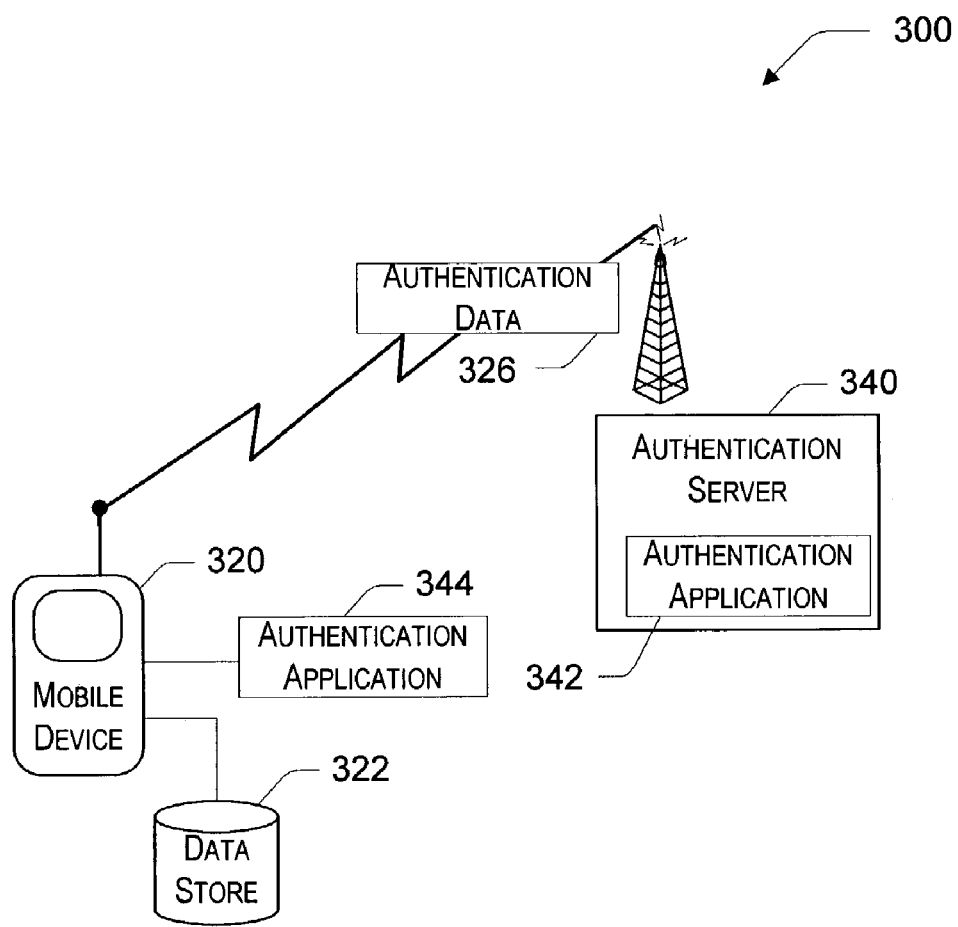
FIG. 3 is a functional block diagram of an authentication system.

FIG. 3 is a functional block diagram generally illustrating one embodiment for an authentication system 300, in accordance with the present invention. In this implementation, the server 340 is a computing device such as the one described above in conjunction with FIG. 1, and the mobile device 320 is a mobile computing device such as the one described above in conjunction with FIG. 2. Authentication application 342 is configured to perform the authentication process between server 340 and mobile device 320. In the embodiment illustrated, authentication applications 342 and 344 are resident on server 340 and mobile device 320.

Mobile device 320 maintains mobile data 322 locally in its storage 268 (shown in FIG. 2). During an authentication session, mobile device 320 and the server 340 exchange information relating to the authentication.

Exemplary Log-In Process

Most corporations that currently use wi-fi utilize 802.1× and support a variety of authentication algorithms. Three of the authentication algorithms include EAP-TLS (certificates), PEAP, and Wi-Fi Protected Access WPA. The EAP-TLS authentication uses certificates and RADIUS servers. PEAP authentication does not use certificates but uses RADIUS servers. WPA is perceived by some to be more secure than WEP because it utilizes TKIP encryption, but in practice, they both appear to be secure in the 802.1× because the keys rotate. WPA has an added benefit over PEAP/EAP-TLS because WPA does not utilize back-end RADIUS servers. WPA still uses either PEAP or EAP-TLS for authentication.

According to one aspect of the invention, the wi-fi login process is improved for networks that use 802.1×. The following are exemplary descriptions according to aspects of the invention.

First Time Connect (802.1× PEAP Network) Example

Ray takes his wi-fi device into the range of his corporate wi-fi network (CORPSSID), which uses 802.1×. A dialog bubble appears on Ray's device asking Ray if he wishes to connect to CORPSSID (See FIG. 7 for an exemplary bubble). Ray clicks connect. A dialog appears asking for the information used to logon onto the network. According to one embodiment, this information includes the username, password, and domain (See FIG. 8 for an exemplary dialog). Ray enters this information and logs onto the network.

First Time Connect (802.1× EAP-TLS Network, Less Common)

Ray takes his integrated wi-fi device into the range of his corporate wi-fi network (CORPSSID), which uses 802.1×. A bubble appears asking Ray if he wishes to connect to CORPSSID. Ray clicks connect. A dialog appears asking for his username/password/domain. Ray enters this information and hits OK. The AP is expecting EAP-TLS authorization, so it returns an error. Ray's device notices this error and switches the EAP type to TLS for this SSID without Ray being alerted to this, then the device tries to associate/connect again using TLS. The username/domain entered before are resubmitted to the AP. A certificate is autoselected for Ray and sent to the AP. Ray logs onto the network.

First Time Connect (802.1x Configured for EAP-TLS Network, User has Multiple Possible Certificates)

Ray takes his integrated wi-fi device into the range of his corporate wi-fi network (CORPSSID), which uses 802.1x. A bubble appears asking Ray if he wishes to connect to CORPSSID. Ray clicks connect. A dialog appears asking for his username/domain. Ray enters this information and hits OK. A dialog appears asking the user to choose a certificate (See FIG. 10 for an example certificate screen). Ray picks the non-expired certificate issued by his company. Ray logs onto the network.

First Time Connect (802.1x Configured for EAP-TLS Network, User has No Certificates)

Ray takes his integrated wi-fi device into the range of his corporate wi-fi network (CORPSSID), which uses 802.1x. A bubble appears asking Ray if he wishes to connect to CORPSSID. Ray clicks connect. A dialog appears asking for his username/domain. Ray enters this information and hits OK. An error message appears telling Ray that he needs a certificate and he should contact his administrator. Alternatively, if the AP returned PEAP, the error message does not indicate that a certificate is needed by the user.

Subsequent Connections Anywhere

User with wi-fi walks into the range of a wi-fi network and is connected without the user of a user interface (UI).

PEAP (default) vs. EAP-TLS Authentication

According to another embodiment of the invention, PEAP is the dominant authentication method. PEAP doesn't require certificates. The present invention is extensible to other authentication methods.

According to one embodiment, the operating system exposes registry settings with flags that indicate whether a particular authentication method requires a call into the username/password/domain UI (for PEAP) or the username/domain U1 (for TLS).

According to one embodiment, after one successful login, future logins do not use a UI. According to one embodiment, the username/domain may also be prefilled and be UI-less.

Process Flows

Figure 4:
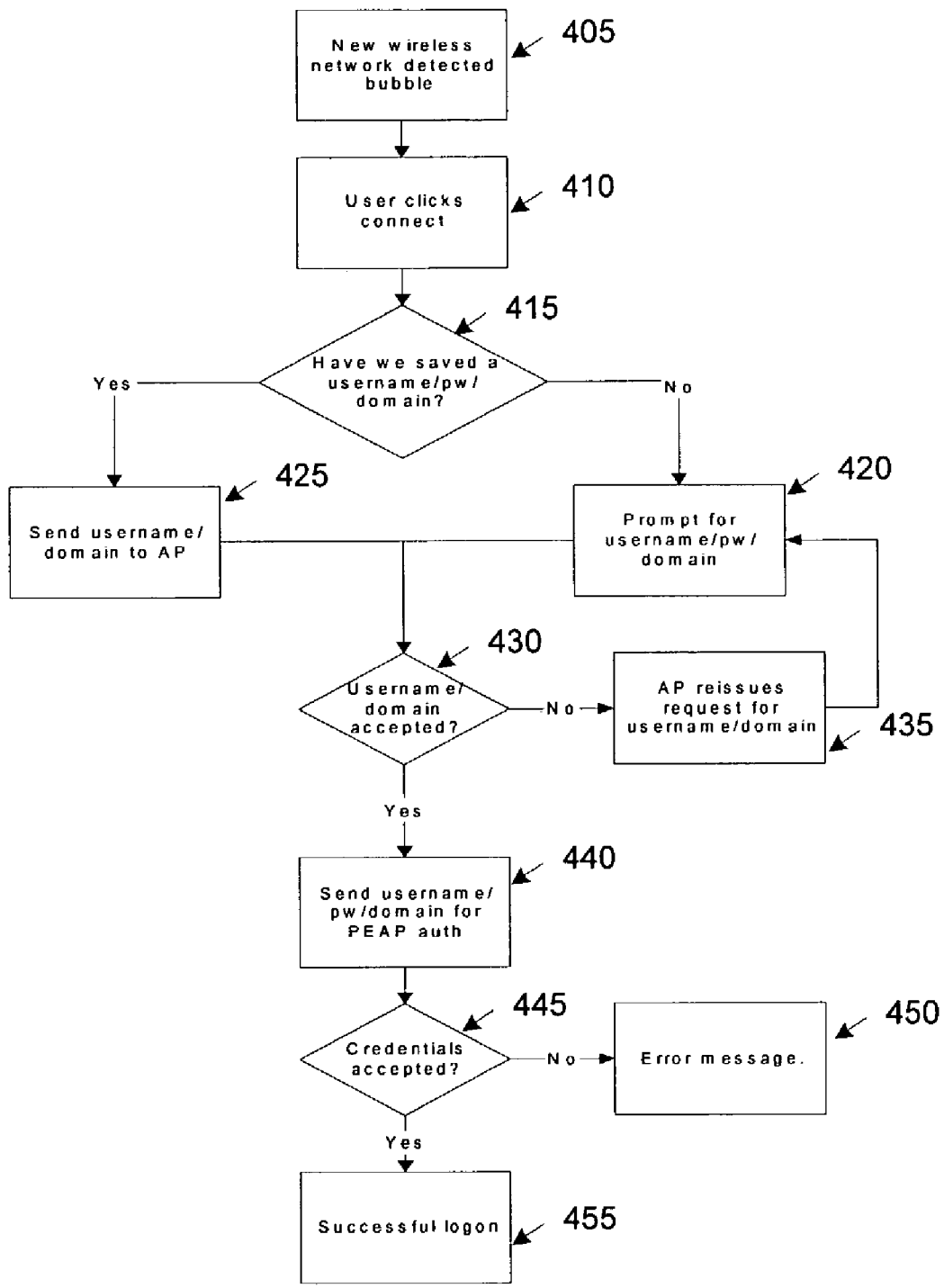
FIG. 4 illustrates a process for logging into a network with PEAP.

FIG. 4 illustrates a process for logging into a network with PEAP, in accordance with aspects of the invention. After starting, the process flows to block 405, where a new wireless network is detected. Moving to block 410, the user clicks connect to begin connecting to the network. Flowing to decision block 415, a determination is made as to whether the login information for the domain has been saved. When the information has not been saved, the process flows to block 420 where the user is prompted for the information required to logon to the network. According to one embodiment, this information includes a username, password, and domain. When the information has been saved, the process flows to block 425 where the username and domain are sent to the AP. The process then moves to decision block 430 where a determination is made as to whether the username/domain is accepted. When the username/domain is not accepted, the process flows to block 435 to re-request the information. When the information is accepted, the process flows to block 440 where the information is sent for PEAP authorization. Transitioning to decision block 445 a determination is made as to whether the credentials are accepted. When they are not accepted the process flows to block 450 where an error message is sent. When the credentials are accepted, the login is successful (block 455), and the process returns to processing other actions.

Figure 5:
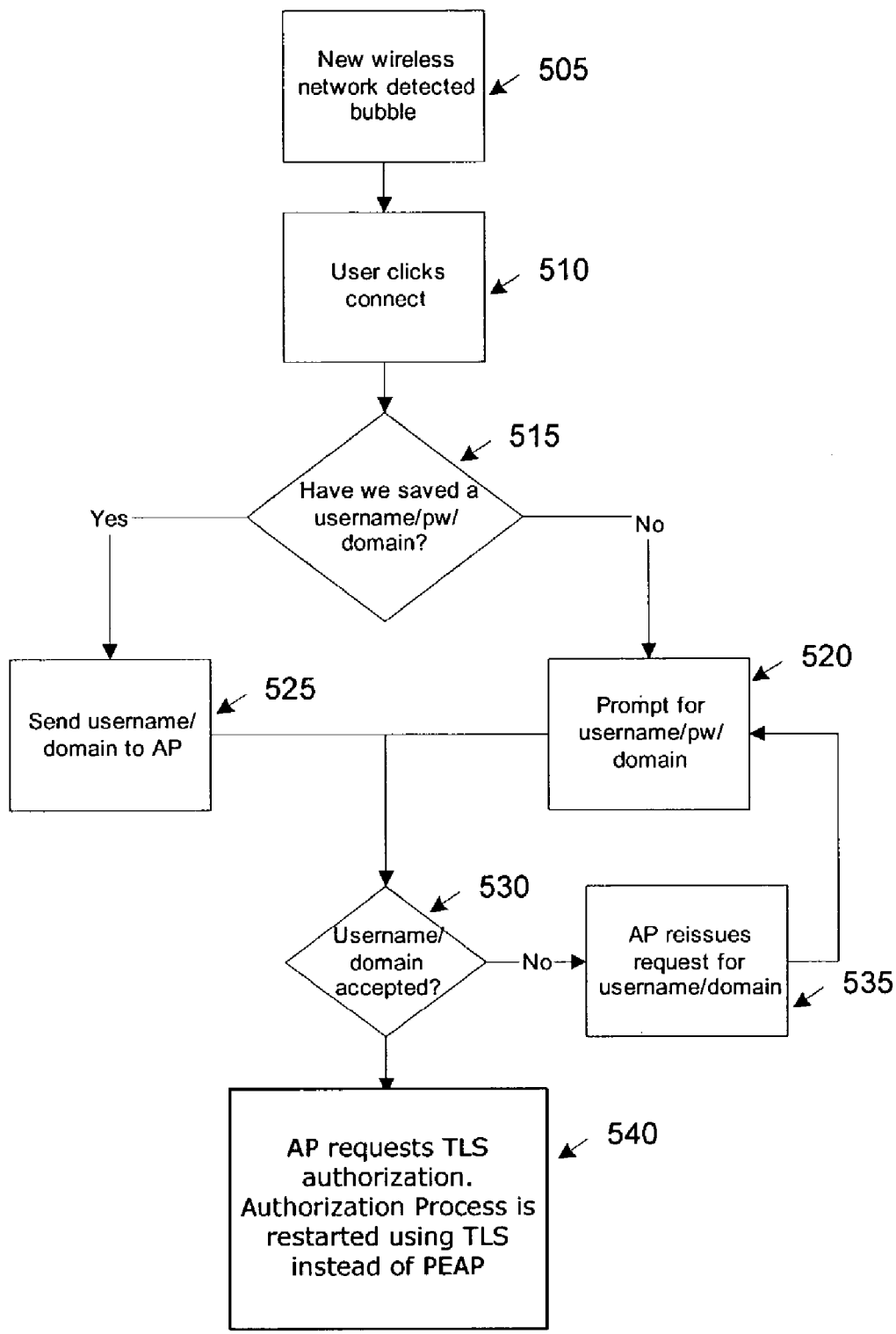
FIG. 5 illustrates a process of an attempted PEAP login on a TLS network (error case)

FIG. 5 illustrates a process of an attempted PEAP login on a TLS network (error case), in accordance with aspects of the invention. After starting, the process flows to block 505, where a new wireless network is detected. Moving to block 510, the user clicks connect to begin connecting to the network. Flowing to decision block 515, a determination is made as to whether the login information for the domain has been saved. When the information has not been saved, the process flows to block 520 where the user is prompted for the information required to logon to the network. According to one embodiment, this information includes a username, password, and domain. When the information has been saved, the process flows to block 525 where the username and domain are sent to the AP. The process then moves to decision block 530 where a determination is made as to whether the username/domain is accepted. When the username/domain is not accepted, the process flows to block 535 to re-request the information. When unsuccessful gaining authorization, the AP automatically switches authentication procedures to TLS authorization without interaction from the user and the authorization process is restarted using TLS instead of PEAP (block 540). The process then returns to processing other actions.

Figure 6:
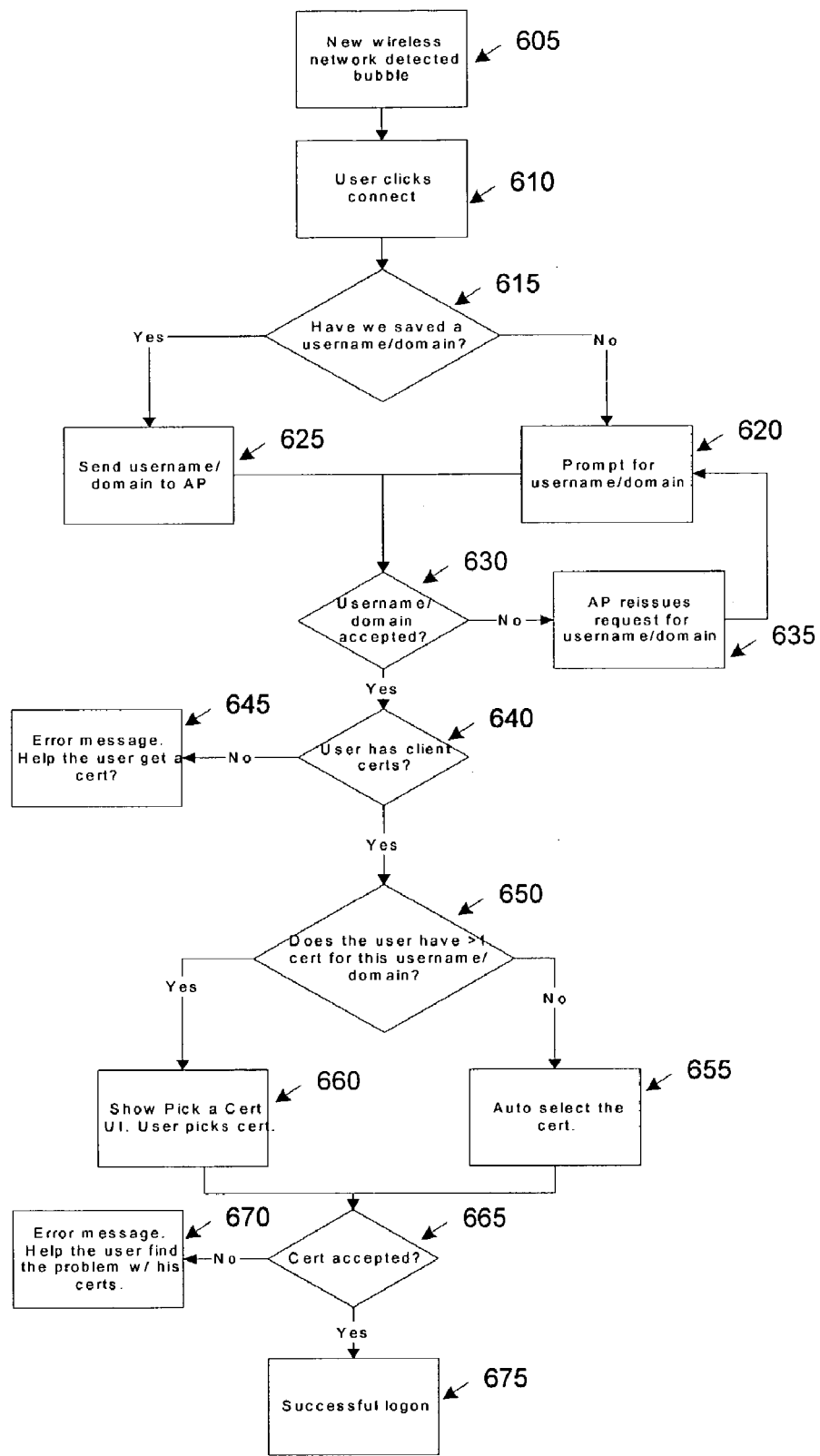
FIG. 6 illustrates a process for TLS authentication and selecting certificates.

FIG. 6 illustrates a process for TLS authentication and selecting certificates, in accordance with aspects of the invention. After starting, the process flows to block 605, where a new wireless network is detected. Moving to block 610, the user clicks connect to begin connecting to the network. Flowing to decision block 615, a determination is made as to whether the login information has been saved. When the information has not been saved, the process flows to block 620 where the user is prompted for the information required to logon to the network. According to one embodiment, this information includes a username and domain. When the information has been saved, the process flows to block 625 where the username and domain are sent to the AP. The process then moves to decision block 630 where a determination is made as to whether the username/domain is accepted. When the username/domain is not accepted, the process flows to block 635 to re-request the information. Flowing to decision block 640 a determination is made as to whether the user has client certificates. When the user does not have client certificates the process flows to block 645 where an error message is sent and possibly assist the user in obtaining a certificate. When the user does have a certificate, the process flows to block 650 where a determination is made as to whether the user has more than one certificate for the username and domain supplied. When the user does not have more than one certificate, the process flows to block 655 where the certificate is automatically selected. When the user does have more than one certificate the process flows to block 660 the user selects a certificate from a choice of certificates. Moving to decision block 665 a determination is made as to whether the certificate is accepted. When the certificate is not accepted the process moves to block 670 where an error message is returned to the user and help may be provided to the user to help correct the problem with the certificate. When the certificate is accepted, the process flows to block 675 where the login is successful. The process then returns to processing other actions.

FIGS. 7-13 illustrate exemplary screenshots, according to aspects of the invention.

Figure 7:
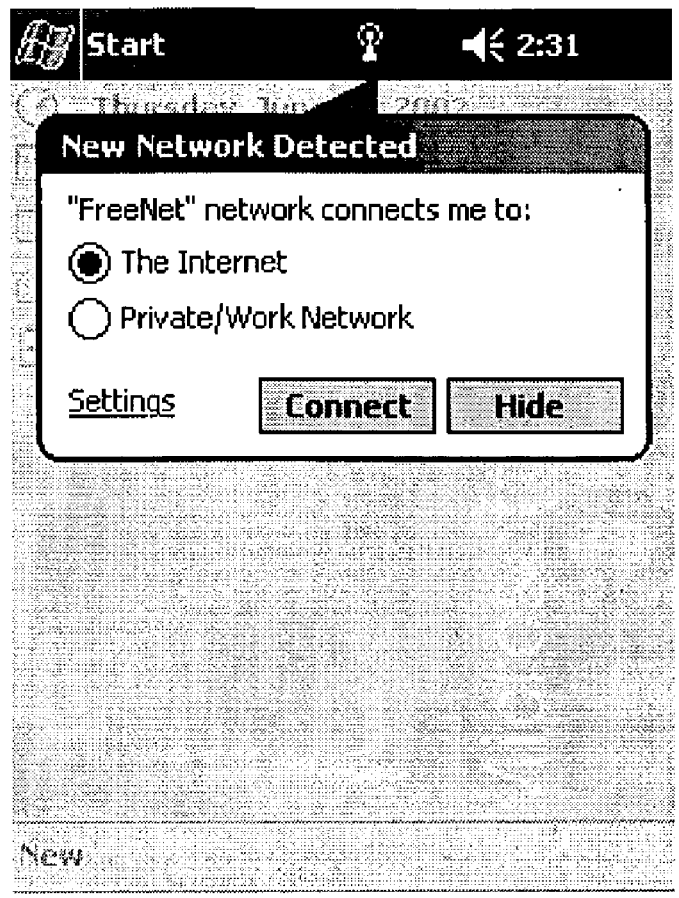
FIGS. 7-13 illustrate exemplary screenshots, according to aspects of the invention.

FIG. 7 illustrates an exemplary screenshot for a new network detected, in accordance with aspects of the invention. As illustrated, a bubble for a detected wi-fi network appears.

According to this embodiment, the user chooses to connect to the Internet.

Figure 8:
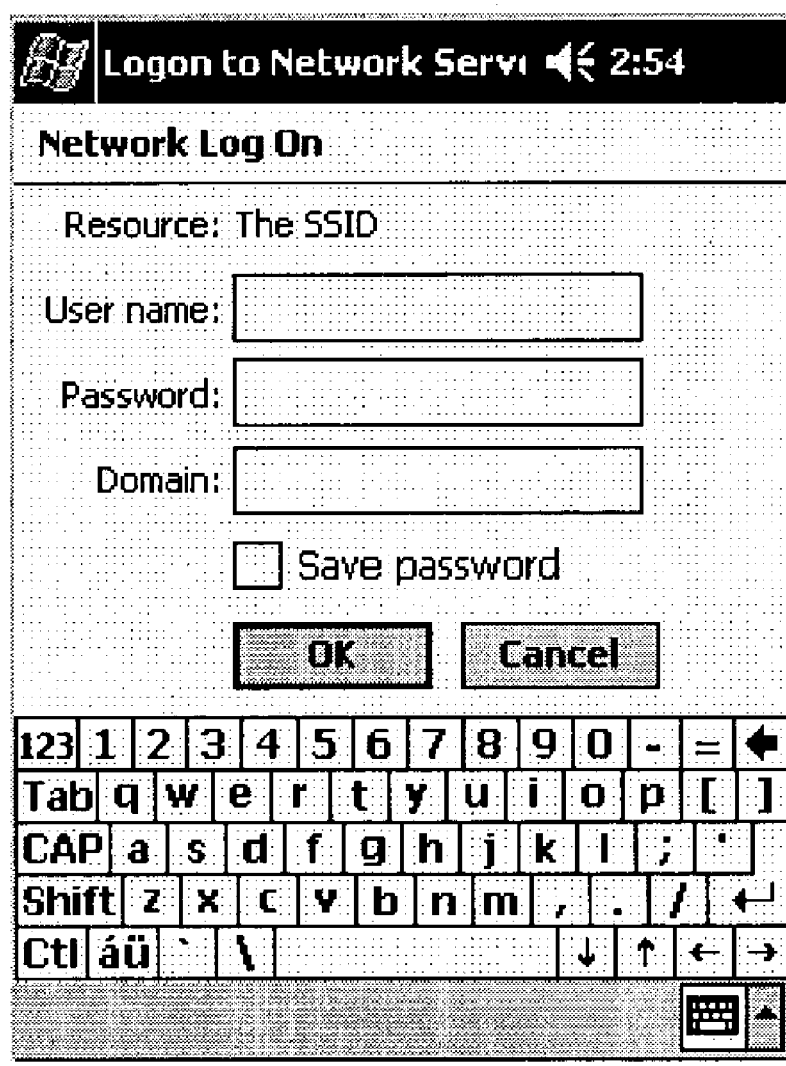

FIG. 8 illustrates an exemplary screenshot logging on to a network server using PEAP, in accordance with aspects of the invention. As illustrated, the user is asked for the information used to logon to the network. According to one embodiment, the information includes the user name, password, and domain. After the user clicks OK, the device sends the username/domain information to the AP. The username/domain are saved if they are accepted; otherwise, this dialog is repeated with the previously typed username/domain. The AP then asks for PEAP authentication. If the username/password/domain are accepted, the user is done. The password is saved if the user checked the checkbox. According to one embodiment, ff the password is rejected, the AP terminates the association and an error message is displayed. If the AP asks for an alternate type of authentication, the logon process is restarted and this SSID is switched to use that new authorization type.

Figure 9:
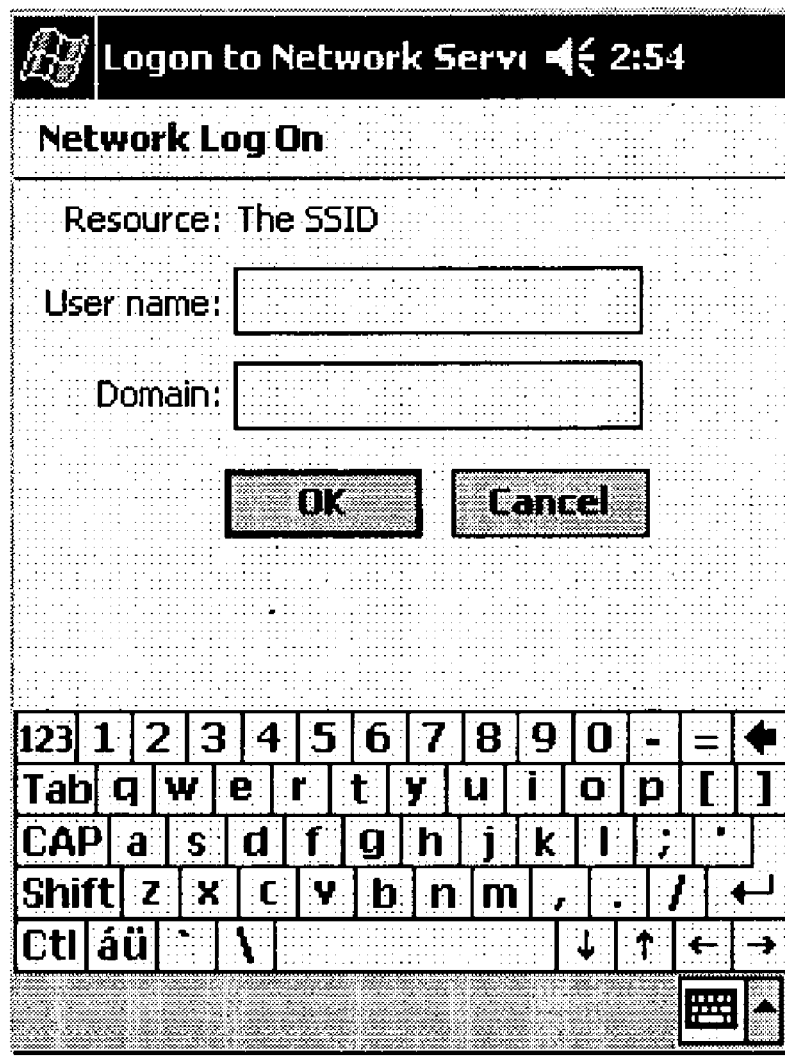

FIG. 9 illustrates an exemplary screenshot logging on to a network server using TLS, in accordance with aspects of the invention. As illustrated If TLS, is used the username/domain are requested. If this is a first time logon and the user has not clicked settings to choose TLS, PEAP is the default and the user will get the PEAP experience, followed by an error since he cannot logon. After the user clicks OK, the device sends the username/domain information to the AP. The username/domain are saved if they are accepted; otherwise, this dialog is repeated with the previously typed username/domain. If the AP asks for an alternate type of authentication, the login process is automatically restarted and switch this SSID to use the new authorization type.

Figure 10:
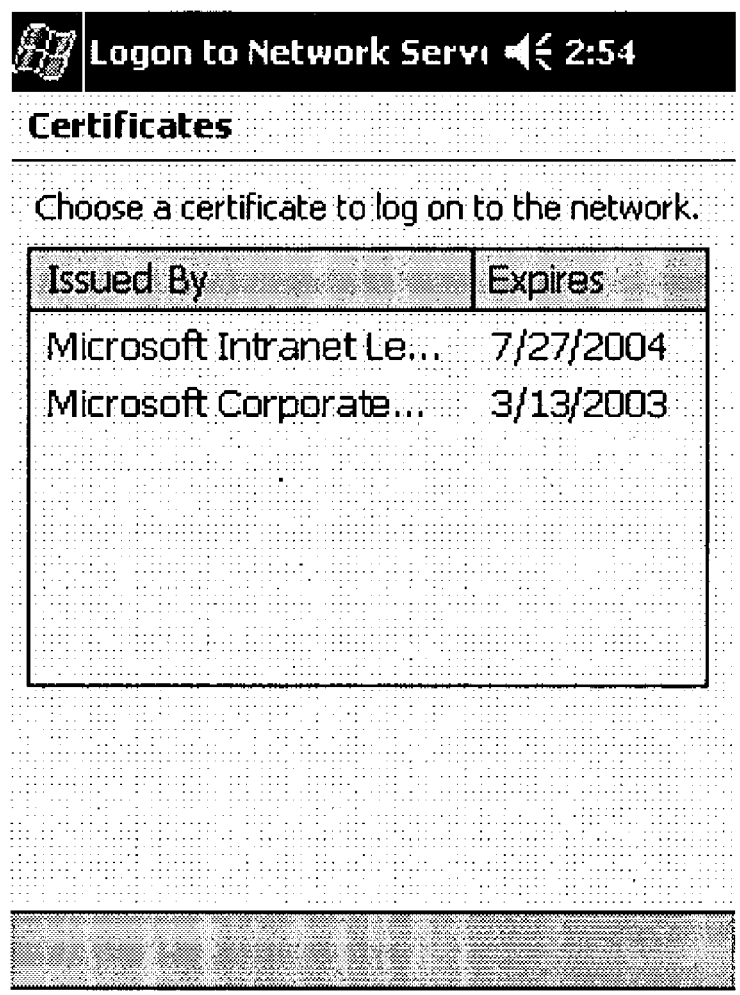

FIG. 10 illustrates an exemplary screenshot when TLS does not pick the certificate automatically, in accordance with aspects of the invention. The username/domain generally allows the proper client certificate to be chosen automatically. If it works, there is no more UI. If no appropriate client certificates are available, an error message is displayed and an offer may be made to take the user to the certificate management UI.

According to one embodiment, the Pick a Certificate UI displayed in FIG. 10 only shows appropriate client certificates and not all of the client certificates. According to one embodiment, tapping on a certificate chooses that certificate. Tap&Hold shows one menu item: properties. Selecting properties goes to the certificate properties page. If the chosen certificate is rejected, an error popup ("the certificate was not accepted") is displayed.

Figure 11:
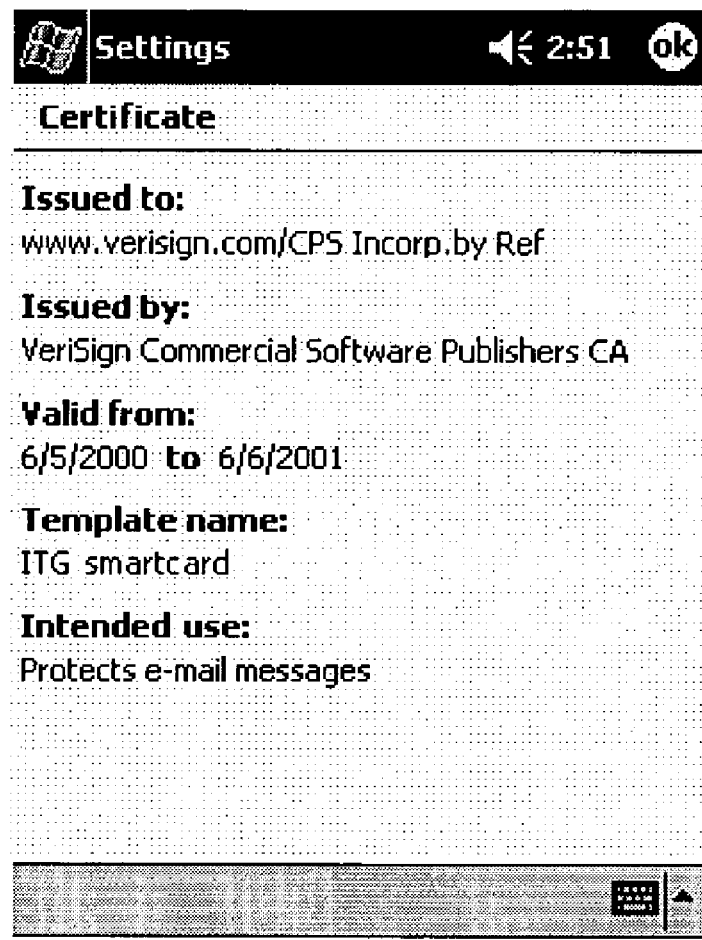

FIG. 11 illustrates exemplary properties of a certificate, in accordance with aspects of the invention. If the network is unprotected, the client have timeouts asking the AP for 802.1x support. This can take up to 9 seconds (3 retries of 3 seconds each). Once connected to the network unprotected, the user's setting is changed to connect to this SSID without 802.1x enabled. According to one embodiment of the invention, all of the appropriate certificates are not automatically cycled through due to the way APs work. After a certificate fails, the AP terminates the association. Instead, the system reassociates and tries again.

Figure 12:
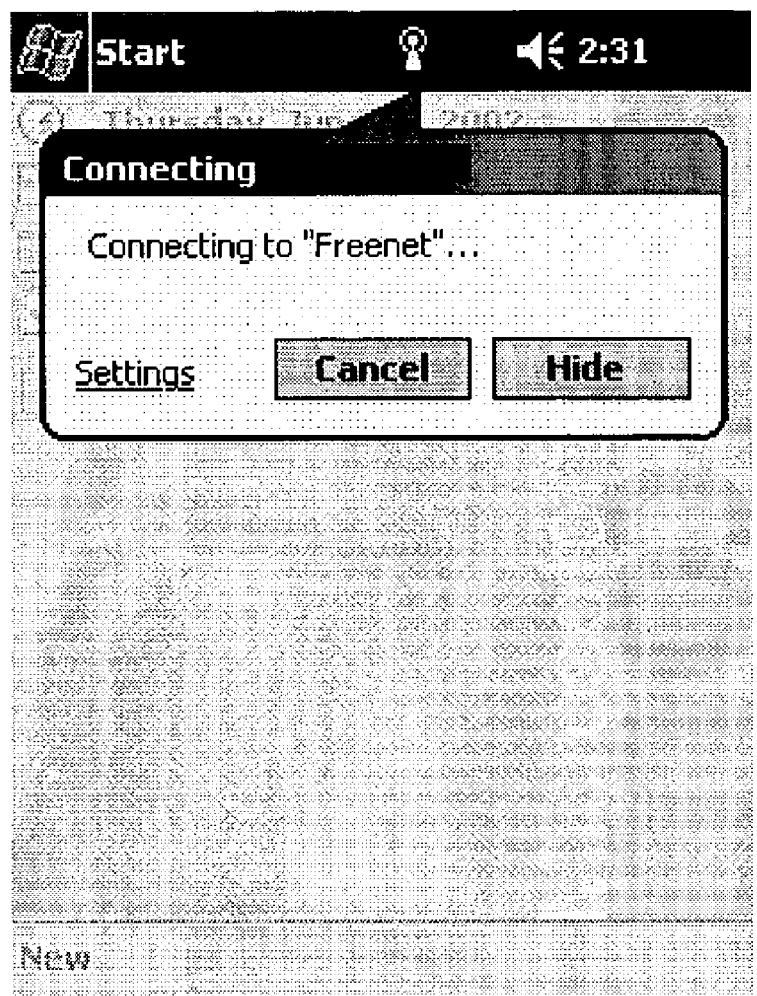

FIG. 12 illustrates an exemplary progress UI, in accordance with aspects of the invention. According to one embodiment, progress is shown in two cases. Immediately after the user clicks connect on the bubble up to the point that a logon UI is shown (e.g. username/password, certificate picker). This helps to ensure that status is shown during potential delays (e.g. trying 802.1x on an unprotected network).

If the AP asks for a different type of authentication than the one currently be attempted, the progress bubble is shown as the system is waiting to reassociate (this can take up to 60 seconds). For example, in the case where PEAP authentication is first attempted, then TLS, the user clicks connect, the progress UI is shown. The username/password/domain is asked for, the AP asks for TLS, the process is restarted, the progress UI is shown again, then the user is logged onto the network.

Clicking the Settings link cancels the current connection and goes to the Wireless networking settings. Cancel cancels the wi-fi connection. Hide hides the bubble.

Figure 13:
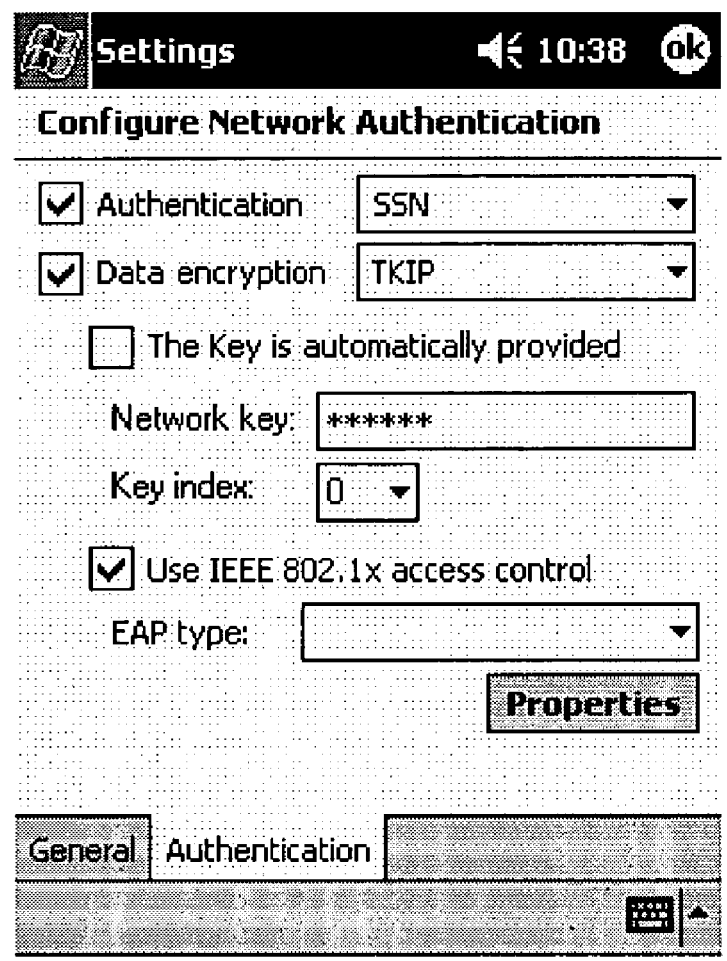

FIG. 13 illustrates an exemplary configure network authentication dialog, in accordance with aspects of the invention. The authentication, data encryption, key settings, and access controls may be configured according to one embodiment of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for automatic client authentication for a wireless network protected by an authentication protocol, comprising:
   detecting the wireless network;
   obtaining confirmation, a username and a domain from a user before connecting to the wireless network when it is the first connection to the wireless network and when it is a subsequent connection to the wireless network skipping the confirmation step before connecting to the wireless network;
   attempting to authenticate the user using a default authentication protocol to access the wireless network; wherein attempting to authenticate the user includes transmitting via the default protocol the username and the domain;
   determining when the authentication protocol is unsuccessful to access the wireless network, and when unsuccessful, automatically attempting authentication using a different authentication protocol and transmitting via the different protocol the username and the domain.

2. The method of claim 1, wherein attempting to authenticate the user using the default authentication protocol, further comprises: obtaining information used to authenticate the user.

3. The method of claim 2, wherein obtaining the information used to authenticate the user, further comprises: obtaining a username and domain.

4. The method of claim 2, wherein obtaining information used to authenticate the user further comprises using a UI to obtain the information.

5. The method of claim 2, wherein obtaining information used to authenticate the user further comprises retrieving the information from a data store.

6. The method of claim 3, further comprising obtaining a password.

7. The method of claim 1, wherein the default authentication protocol is PEAP.

8. The method of claim 7, wherein the different authentication protocol is TLS.

9. The method of claim 8, wherein a certificate associated with the user and the TLS protocol is automatically chosen.

10. The method of claim 8, wherein the user selects a certificate.

11. The method of claim 1, wherein determining when the authentication is unsuccessful further comprises receiving an error indicating that the authentication is unsuccessful.

12. The method of claim 1, further comprising determining when the wireless network is unprotected and connecting to the network without 802.1x enabled.

13. A system for automatically authenticating a user on a wireless network protected by an authentication protocol, comprising:
a processor and a computer-readable medium;
an operating environment stored on the computer-readable medium and executing on the processor;
a wireless interface layer operating under the control of the operating environment and configured to connect with another device; and
an authentication device operating under the control of the operating environment and operative to perform actions, including:
obtaining confirmation, a username and a domain from the user before connecting to the wireless network when it is the first connection to the wireless network and when it is a subsequent connection to the wireless network skipping the confirmation step before connecting to the wireless network;
attempting to authenticate the user on the wireless network using a default authentication protocol when the wireless network is detected; wherein attempting to authenticate the user includes transmitting via the default authentication protocol the username and the domain; and
determining when the authentication of the user on the wireless network is unsuccessful, and when unsuccessful, automatically attempting authentication using a different authentication protocol and transmitting via the different authentication protocol the username and the domain.

14. The system of claim 13, wherein attempting to authenticate the user using the default authentication protocol, further comprises using a display to obtain information used to authenticate the user.

15. The system of claim 14, wherein obtaining the information used to authenticate the user, further comprises: obtaining the information from a data store used to authenticate the user.

16. The system of claim 13, wherein the default authentication protocol is PEAP.

17. The system of claim 16, wherein the different authentication protocol is TLS.

18. The system of claim 17, wherein a certificate associated with the user and the TLS protocol is automatically chosen.

19. The system of claim 13, wherein determining when the authentication is unsuccessful further comprises receiving an error from another device indicating that the authentication is unsuccessful.

20. The system of claim 13, further comprising determining when the wireless network is unprotected and connecting to the network without 802.1x enabled.

21. A tangible computer-readable medium having computer executable instructions for automatically authenticating a user on a wireless network protected by an authentication protocol, comprising:
detecting the wireless network;
obtaining confirmation, a username and a domain from the user before connecting to the wireless network when it is the first connection to the wireless network and when it is a subsequent connection to the wireless network skipping the confirmation step and obtaining a new username and domain from the user before connecting to the wireless network;
attempting to authenticate the user on the wireless network using a default authentication protocol; wherein attempting to authenticate the user includes transmitting via the default authentication protocol the username and the domain that are formatted according to the default protocol authentication;
obtaining another username and domain from the user if the username and domain is not accepted;
when the username and the domain name are accepted, request an authentication using a first protocol; and
determining when the authentication is unsuccessful, and when unsuccessful, automatically attempting authentication using a different authentication protocol and transmitting via the different authentication protocol the username me and the domain that are formatted according to the different authentication.

22. The computer-readable medium signal of claim 21, wherein attempting to authenticate the user using the default authentication protocol, further comprises using a display to obtain information used to authenticate the user until the information is saved.

23. The computer-readable medium of claim 21, wherein the default authentication protocol is PEAP.

24. The computer-readable medium of claim 23, wherein the different authentication protocol is TLS.

25. The computer-readable medium of claim 24, wherein a certificate associated with the user and the TLS protocol is automatically chosen.

26. The computer-readable medium of claim 21, further comprising determining when the wireless network is unprotected and connecting to the network without 802.1x enabled.

* * * * *